Aug. 30, 1949.  A. C. CURTIS ET AL  2,480,358
APPARATUS FOR COATING THE INTERIOR OF PIPE LINES
Filed April 12, 1948  2 Sheets-Sheet 2
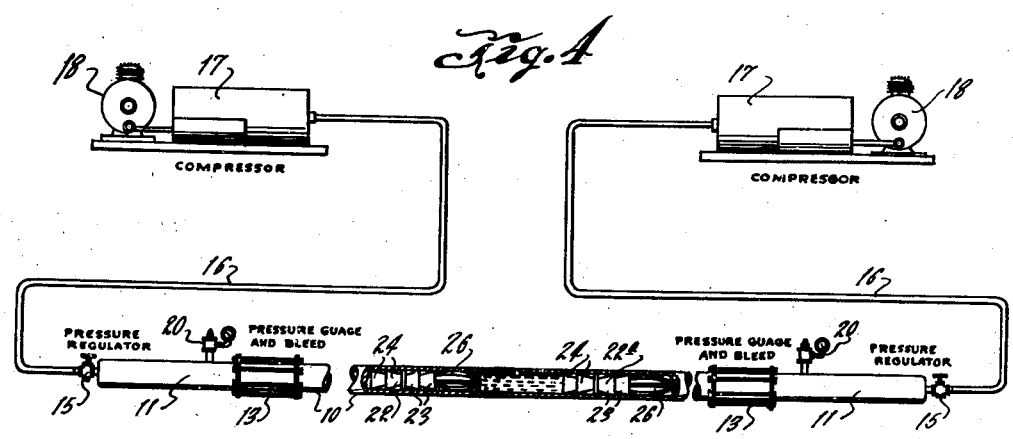
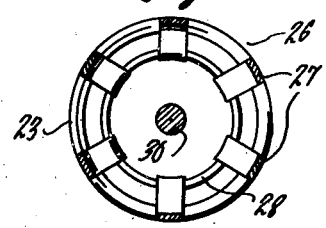
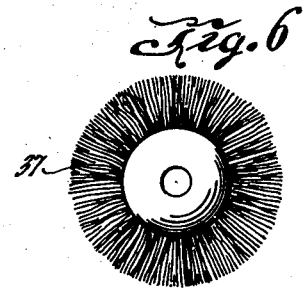
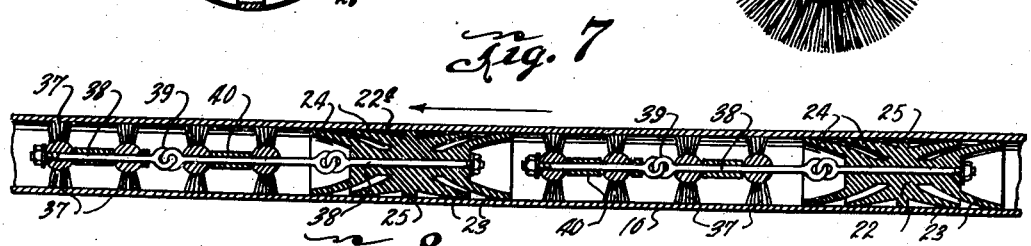
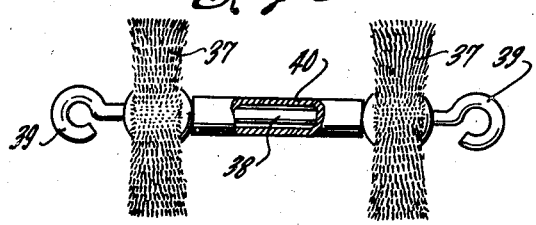
Arvel C. Curtis
Cleo S. Tomlinson
INVENTORS
ATTORNEY Patented Aug. 30, 1949

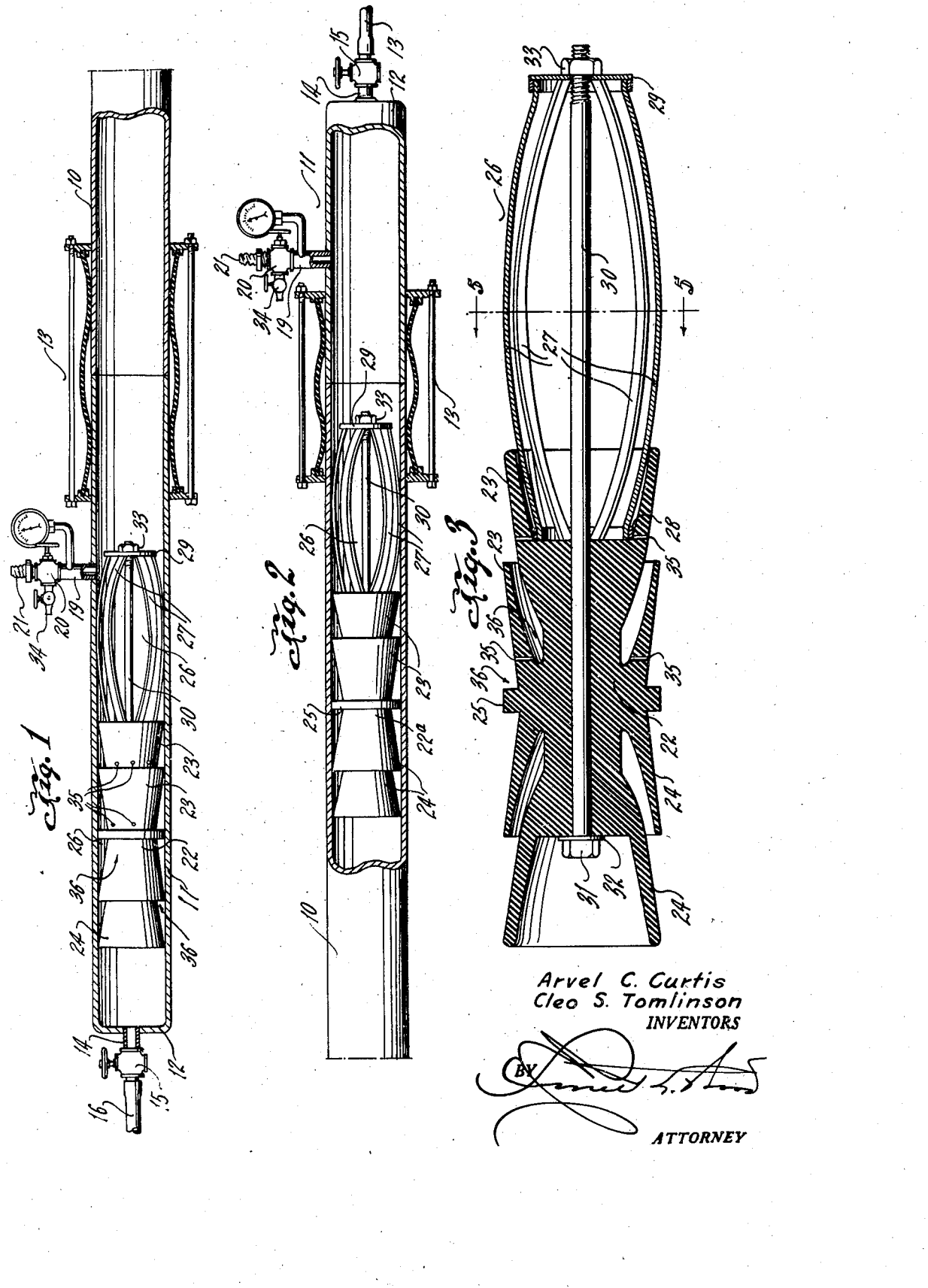

2,480,358

UNITED STATES PATENT OFFICE 2,480,358

APPARATUS FOR COATING THE INTERIOR OF PIPE LINES

Arvel C. Curtis and Cleo S. Tomlinson, Odessa, Tex.

Application April 12, 1948, Serial No. 20,458

6 Claims. (Cl. 91—30)

This invention relates to apparatus for treating the interior of pipe lines to deter rust and corrosion and it has particular reference to an improved apparatus as well as a process for coating the interior of pipe lines used chiefly for transporting oil and gas over long distances.

It has long been the practice to periodically apply needed coating of paint to the exterior of pipe lines to preserve them against rust and corrosion which would cause rapid deterioration and consequent leakage, the latter alone creating great financial loss as well as hazard in the case of highly inflammable fluids such as oil and gas. As far as is known, existing apparatus for coating the interior of pipe are more or less limited to short lengths of pipe of small diameter as compared to pipe lines used for conveying oil and gas which are frequently many miles in length. No satisfactory nor economical apparatus and process is known for effectively applying a rust resisting coating to pipe lines and at a cost which would justify use thereof.

It is therefore the principal object of the invention to provide an efficient and economical process for coating the interior of pipe lines and apparatus for the accomplishment thereof in which the equipment of which the apparatus is comprised is comparatively simple and inexpensive, and with which a composition having known rust resisting qualities may be spread quickly and evenly on the interior surface of a pipe line over great distances.

Another object of the invention is to provide an apparatus and process for coating the interior of pipe lines which consists of complementary plugs of resilient composition, each being, in fact, a specially constructed, double opposed plug having belled flanges at each end which are expandable under pressure. The flanges at one end of one of the plugs defining annular distributing chambers for coating material which the trailing flanges thereof serve as wipers for spreading the material on the interior of the pipe as the two plugs are propelled through the pipe line by pressure of a gaseous medium with the coating fluid therebetween.

Another object of the invention is to provide a rubber plug, consisting of an elongated body having on each end a pair of tandem expansion cups, the cups on one end opposing those on the opposite end. A guide is attached to one end of the plug by means of a rod extending axially through the guide and plug, the said guide serving to direct the plug over irregularities in the interior of a pipe line and around curves and bends thereof.

Still another object of the invention is to provide an improved process for coating the interior of pipe lines which consists in introducing a predetermined quantity of liquid coating material between spaced apart rubber plugs in a pipe line, each of said plugs having annular, expansible material distributing and wiping flanges thereon, applying a gaseous medium against one end of one of the plugs to propel both of said plugs and the intervening body of coating material through the pipe line and in regulating the pressure of air in advance of the plugs as they travel through said pipe line.

Yet another object of the invention is to provide an apparatus and process as set forth which lends itself to the cleaning of the interior of pipe lines preparatory to coating the same, by the use of a suitable solvent or cleaning composition, accompanied by steel wire brushes effective to dislodge rust and other matter adhering to the interior of the pipe line, the said brushes being joined to and moved through the pipe line by the pressure propelled rubber plugs previously mentioned, between which is placed the cleaning composition for distribution on the pipe line walls.

With the foregoing objects in view, the invention has further reference to certain features of accomplishment which will become apparent as the description proceeds, taken in connection with the accompanying drawings wherein:

Figure 1 is a longitudinal sectional view of one end or section of a pipe line showing the coating distributing and spreading plug of the invention.

Figure 2 is a continuation of Figure 1 showing a longitudinal sectional view of the opposite end or section of the pipee line, showing the leading or companion plug of the assembly.

Figure 3 is a longitudinal sectional view of the coating distributing and spreading plug per se and the guide therefor.

Figure 4 is a schematic view showing a length of pipe line, partly in longitudinal section containing the cooperating plugs and showing compressors for introducing a gaseous medium into either end of the pipe line to propel the plugs therein.

Figure 5 is a view in transverse section, taken on line 5—5 of Figure 3.

Figure 6 is a detail view of one of the cleaning brushes shown in Figures 7 and 8.

Figure 7 is a longitudinal sectional view of a length of pipe line showing therein the plugs of the invention with which is associated an assembly of brushes for cleaning the interior of a pipe line, and Figure 8 is a side elevational view of a pair of brushes showing the coupling and spacing means therefor, the latter being partly in section.

Continuing with a more detailed description of the drawings, reference is made primarily to Figures 1 and 2 therein numeral 10 denotes a pipe line made up of many sections of pipe. The pipe line may be in length from but a few feet to several miles. Pipe lines whose interior the invention is designed to treat are preferably those through which petroleum products are transported long distances. Every precaution is taken to protect the exterior of these pipe lines from rust and corrosion to prolong the necessity for replacements and to insure against hazards caused by leakage of oil and gas.

Whether the pipe line 10 is coated from end to end or in sections of predetermined length, the ends of the portion thereof to be treated are each fitted with an identical pup joint 11, each having a closed end 12 and with its opposite end abutting an end of the pipe line 10. A dresser sleeve 13 of conventional manufacture secures the pup joints to the pipe line, as shown and seals the same against leakage at the joints.

Each of the pup joints 11 has a nipple 14 entering the closed end thereof, on which is threaded or otherwise attached a valve 15. A tube 16 which may be a hose, is connected to the valve has a nipple 21 to which is connected a hose pression tank 17 of an air compressor 18.

Intermediate the ends of the pup joint 11 is a nipple 19 on which is mounted a valve 20. This valve has a nipple 21 to which is connected a hose (not shown) through which a coating composition or other liquid is introduced into the pup joint for passage into the pipe line 10 in a manner to be presently described. Further reference to the valve 20 will be made later in the description.

Referring now specifically to the resilient plugs employed to transport the coating material or paint through the pipe line, attention is directed to Figure 3 wherein numeral 22 denotes generally the body of the rubber plug which may be referred to as the trailing plug or the distributing and spreading plug. This plug is a molded body of rubber and is formed with two expansion cups 23 on one end and identical cups 24 on the other end thereof which are directed oppositely to the first cups. Surrounding the body at its midsection is an integral ring 25.

In spaced relation to the plug 22 in the pipe line 10 is another and identical plug, identified by the reference numeral 22a and in view of its similarity to the first mentioned plug, the same reference numerals are otherwise used to indicate like parts throughout. The last mentioned plug may be identified as the lead plug.

Each of the plugs 22 and 22a has a guide consisting of a cage, generally indicated by reference numeral 26 and consisting of a plurality of steel straps 27, arcuated as shown, and whose ends are welded or otherwise secured to an annular member 28 (Fig. 3) at one end of the guide 26 and which lies in the outer expansion cup 23. The opposite ends of the straps are secured in like manner to a cap 29 and a tie rod 30 extends through this cap and axially through both the guide 27 and plug. A head 31 is provided on one end of the rod 30, which rests against a washer 32 while the opposite end is threaded to receive a nut 33, bearing against the cap 29; thus, the guide and plug are held securely together.

The guide for each plug is of the same construction and each serves to direct its plug around curves and bends in the pipe line.

In operation, the lead plug 22a is inserted in the open end of the pipe line 10 before the pup joint 11 is attached thereto and the trailing plug is inserted into the pup joint in the relationship shown in Figures 1 and 2. A hose connection is made between the nipple 21 of valve 20 and a suitable pump, not shown, which is adapted to deliver paint into the space between the plugs 22 and 22a.

To predetermine the quantity of coating composition introduced, as set forth, the surface to be coated is calculated by the length of the pipe line or section thereof to be treated. In introducing the coating material, air in the space between the plugs 22 and 22a is exhausted through a bleeder valve 34 as it is replaced by the paint. When paint emerges from the valve 34, the latter is closed, as is likewise the valve 20.

A back pressure is built up in the pipe line 10 in advance of the leading plug 22a by opening the valve 15 at the opposite end of the pipe line or the section thereof being treated. Air from the compressor connected to the valve will fill the line 10 and will offer resistance to the plugs 22 and 22a as they are driven through the pipe line by air from the opposite compressor 17, released into the pipe line behind the trailing plug 22 by opening the companion valve 15.

As the plugs 22 and 22a are caused to travel through the pipe line 10, their rate of speed is regulated by controlling the escape of air in advance of the plugs. Obviously, at a low rate of speed, more coating material will be deposited on the wall of the pipe than at a high rate of speed but the condition of the interior of the pipe will determine whether it is practical to propel the plugs through the pipe line slowly or rapidly.

It is, of course, possible to coat pipe lines interiorly in the manner described with but one compressor, as long as there is some means in advance of the plug assembly to control egress of air or gas under pressure built up by the plug assembly as it moves in the pipe line. However, it is preferred to employ in the process the two compressors introducing counterpressures for more accurate control of the plugs as they are transported through the pipe line. Also, if it becomes necessary or is found desirable to repeat the operation, the second compressor will be used to reverse the direction of travel of the plug assembly after separating the plugs, which have drawn closer together near the end of their travel, and filling the space between them with coating material for their return travel through the pipe line.

When the painting operation is completed, the lead plug 22a will travel into the pup joint at the end of the pipe line while the trailing plug 22 will stop in the pipe line. The dresser sleeve 13 is removed to detach the pup joint, whereupon the plugs each become accessible for removal.

With reference to the specific performance of the plugs, it will be observed that back pressure built up in advance of the lead plug 22a will expand the cups 23 thereof against the wall of the pipe line 10 with sufficient force to prevent bypassing of advance pressure into the space between the two plugs and will therefore provide for better control of the rate of speed at which the plugs travel. The opposed cups 24 expand under pressure imposed on the body of paint between the plugs by air behind the trailing plug 22, which is introduced by the compressor 18. Thus, passage of the paint from its space forwardly of the lead plug is impossible, as resisted by the cups 24 and the annular element 25 on the body of the plug midway of its ends.

The trailing plug 22 has a series of radial passages 35 through the base of each cup 23 through which coating composition may pass from the space between plugs 22 and 22a into each of the two annular distributing chambers 36 (Fig. 3). As the plug is urged forwardly, the cups 23 will expand against the pipe line walls under pressure imposed on the paint in advance thereof and a certain amount of the paint will fill the annular chambers 36 about the plug and will be brought thereby directly against the walls of the pipe with equal pressure and volume throughout the entire inner circumference of the pipe and will maintain this condition until the supply of paint is completely exhausted, so long as pressure remains on each side of the plug assembly.

The rear cups 24 of the trailing plug 22 are expanded against the pipe line walls by pressure of air from the compressor 18 and serve to spread the coating material deposited onto the pipe line walls by the distributing chambers or recesses 36. Thus, the material is wiped by the flanges of the cups 24 to a uniform thickness and if any of the coating material, when wet, should flow to the bottom of the pipe, this would not be objectionable since it is this portion of the pipe that is most vulnerable to decay and paint in extra thickness would tend to retard the deteriorating effects of rust at this point.

In Figure 7 is shown an adaptation of the plug assembly in cleaning pipe lines preparatory to interiorly coating the same. The plugs are identical to the coating plugs 22 and 22a and bear the same reference numerals. Moreover, these plugs function in the same manner inasmuch as their relative spacing defines a space in which liquid cleaning composition is placed and traversed the length of the pipe line 10 or section thereof to be cleaned. However, instead of the guides 26 previously referred to, a plurality of brushes 37 are attached to the plugs 22 and 22a in advance thereof.

The brushes 37 may be either spiral or circular, as shown and are of conventional manufacture. Preferably, a pair of such wire brushes are mounted on a rod 38 having an eye 39 at each end which is linked with a similar eye on an axially aligned rod. Thus, flexibility of the brush assembly is obtained, enabling the same to be propelled through the pipe line in a manner not unlike that in which the plugs of the coating process are advanced by air pressure through the line 10.

The brushes 37 are maintained in spaced relationship by spacing sleeves 40 which do not interfere with the flexing of the assembly as a whole.

It is to be observed in Figure 7 that the plug and brush assemblies travel in the direction of the arrow, that is to say, with the brushes in advance of the plugs. In this manner, the brushes of the leading plug 22a effect a primary cleaning action under dry conditions, loosening clinging rust scales and other foreign matter which is disintegrated further by the brushes of the trailing plug 22 in the presence of and aided by the solvent or cleaning fluid between the two plugs 22 and 22a.

Manifestly, the construction and process as shown and described is capable of some modification and such modification as may be construed to fall within the scope and meaning of the appended claims is also considered to be within the spirit and intent of the invention.

What is claimed is:

1. Apparatus for interiorly coating a pipe line including a pair of plugs of resilient material adapted to be disposed in spaced apart relationship in said pipe line, the diameter of each of said plugs slightly exceeding the internal diameter of the pipe line, each of said plugs comprising an elongated body having on each end thereof a pair of spaced nested expansion cups enlarging towards the ends of said plug, the cups on one end being opposed to the cups on the opposite end of said body, the leading pair of cups on the trailing plug having perforations extending outwardly through their bases, a guide attached to the front end of each of said plugs, means for introducing a coating composition into said pipe line to fill the space between said plugs, means for introducing air under pressure into said pipe line behind the assembly of plugs to propel the same through said pipe line and variable means for controlling pressure of air in advance of said plug assembly to regulate the rate of speed of said plugs through said pipe line.

2. Apparatus for painting the interior of pipe line to resist rust and corrosion, comprising a lead plug and a trailing plug adapted to be disposed in spaced apart relationship in said pipe line, the diameter of each of said plugs slightly exceeding the internal diameter of the pipe line, each of said plugs consisting of an elongated rubber body, tandem space nested expansion cups formed on each end of said body in reverse relationship enlarging towards the ends of said plug, the confronting cups on opposed plugs defining annular paint distributing chambers, the companion cups on the trailing plug serving as spreading and wiping flanges, the leading pair of cups on the trailing plug having perforations extending outwardly through their bases, means for introducing paint into said pipe line to fill the space between said plugs, means for introducing air under pressure behind said trailing plug to drive said plugs through said pipe line to thereby distribute said paint on the inner surface thereof and variable means for regulating the rate of speed of said plugs through said pipe line.

3. Apparatus for coating the interior of a gas and oil transporting line with paint, comprising a detachable pup joint at each end of said line, an air pressure inlet in the end of each of said joints, a paint inlet and air bleeder valve intermediate the ends of each of said joints, a rubber plug having opposed spaced nested expansion cups enlarging towards the ends of the plug disposed initially in one of said pup joints, the diameter of said plug slightly exceeding the diameter of the pipe line; an analogous plug in said transport line in spaced relation to said first plug, the leading cups on the first mentioned plug having perforations extending outwardly through their bases, means for introducing paint into said pup joint between said plugs and means for injecting air under pressure into the inlet of one of said pup joints to propel said plugs through said line at a rate of speed dependent upon air pressure in said line in advance of said plugs and controlled at the other of said pup joints.

4. Apparatus for painting the interior of pipe line comprising a pup joint at each end of said pipe line, a trailer plug disposed initially in one of said pup joints, the diameter of said plug slightly exceeding the diameter of the pipe line, a companion lead plug disposed in said pipe line in spaced relation to said first plug, each of said plugs having opposed spaced nested expansion cups thereon enlarging towards the ends of the plug; the leading cups of the trailing plug having perforations extending outwardly through their bases, means for introducing paint into the first of said pup joints to fill the space between said plugs, means for introducing air under pressure into said first pup joint behind said trailer plug to advance the latter, said paint and said lead plug through said pipe line whereby certain of said cups will distribute and spread said paint on the inner surface of said pipe line and variable means at the other of said pup joints for regulating the rate of speed of said plugs through said pipe line.

5. In an apparatus for painting the interior of pipe line, a pair of complementary rubber plugs in spaced apart relationship in said pipe line and of diameter slightly exceeding that of the pipe line, each plug having opposed spaced nested expansion cups thereon enlarging towards the ends of the plug; the leading cups of the trailing plug having perforations extending outwardly through their bases, means for introducing paint between the spaced plugs; means for introducing a gaseous medium under pressure behind one of said plugs to drive the same, said paint and the companion plug through said pipe line whereby certain of said cups will spread said paint onto the inner surface of said pipe line and variable means for regulating the rate of speed of said plugs through said pipe line.

6. In an apparatus for painting the interior of a pipe line, a lead plug of diameter slightly exceeding that of the pipe line and comprising an elongated rubber body having axially aligned spaced nested expansion cups on one end and opposed cups on the opposite end thereof, said cups enlarging towards the ends of the plug, a correspondingly shaped trailer plug having axially aligned expansion cups on its leading end defining annular paint collecting and distributing chambers having perforations extending outwardly through their bases, and paint spreading and wiping cups on its trailing end in opposed relation to said first cups, said lead and trailer plugs being disposed in spaced apart relationship in said pipe line, means for introducing paint into said pipe line to fill the space between said plugs, means for injecting a gaseous medium into said pipe line behind said trailer plug to propel said plugs through said pipe line and variable means for regulating the rate of speed of said plugs through said pipe line.

ARVEL C. CURTIS.
CLEO S. TOMLINSON.

REFERENCES CITED

The following references are of record in the file of this patent:

UNITED STATES PATENTS

| Number | Name | Date |
| --- | --- | --- |
| 881,353 | Stewart | Mar. 10, 1908 |
| 907,724 | Boyle | Dec. 29, 1908 |
| 1,746,071 | Cotton | Feb. 4, 1930 |
| 1,796,338 | Moore | Nov. 17, 1931 |
| 2,194,701 | Harrison | Mar. 26, 1940 |
| 2,445,645 | Stephens | July 20, 1948 |